June 12, 1923.

K. W. LIEBAU

PACKING

Filed Sept. 1, 1920

1,458,660

Inventor.
K. W. Liebau.

By Geo. P. Kimmel.
Attorney

Patented June 12, 1923.

1,458,660

UNITED STATES PATENT OFFICE.

KARL W. LIEBAU, OF FRESNO, CALIFORNIA.

PACKING.

Application filed September 1, 1920. Serial No. 407,385.

*To all whom it may concern:*

Be it known that I, KARL W. LIEBAU, a citizen of the United States, residing at Fresno, county of Fresno, and State of California, have invented certain new and useful Improvements in Packing, of which the following is a specification.

This invention relates to devices for preventing lubricants from escaping from axle and other bearings and to exclude dust and other foreign matter therefrom, and has for one of its objects to simplify and improve the construction and increase the efficiency and utility of devices of this character.

Another object of the invention is to provide a device of this character which may be adapted without material structural change to shafts and bearings of various construction and employed for various purposes.

With these and other objects in view, the invention consists in certain novel features of construction as hereinafter shown and described and then specifically pointed out in the claim, and in the drawings illustrative of the preferred embodiment of the invention.

Figure 1:
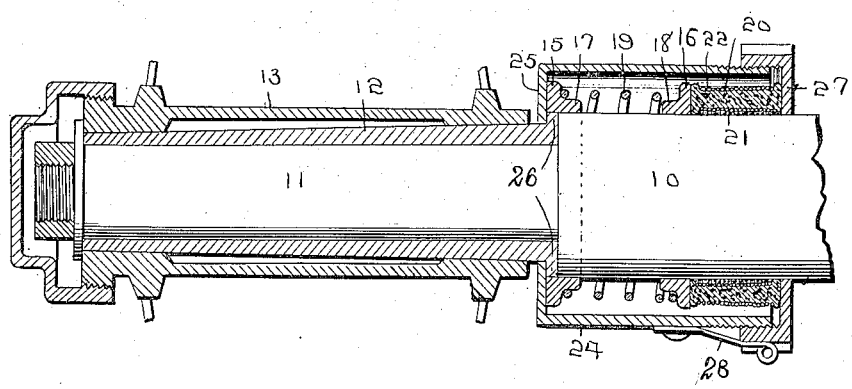
Figure 1 is a longitudinal section.
Figure 2:
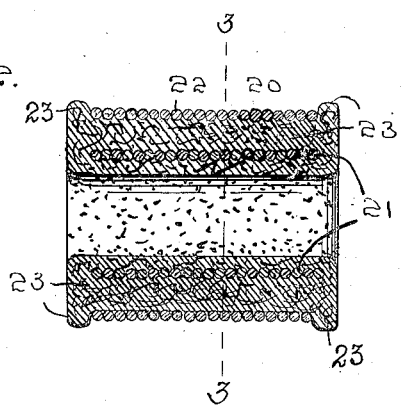
Fig. 2 is a longitudinal section, enlarged, of the packing washer.
Figure 3:
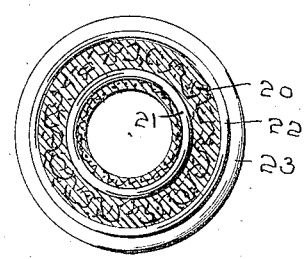
Fig. 3 is a transverse section on the line 3—3 of Fig. 2.

For the purpose of illustration the improved device is shown applied to a conventional automobile axle, a portion of which is represented at 10 with the journal at 11, and the bearing skein at 12. The wheel hub is represented at 13 and of the usual form.

Mounted upon the axle 10 next to the skein 12 is a stop collar 15.

Slidable on the axle 10 is another collar 16.

The stop collar 15 is formed with a hub 17 while the collar 16 is formed with a similar hub 18, the hubs extending toward each other and providing supports for the end portions of a coiled spring 19.

Located upon the axle 10 next to the movable collar 16 is a packing washer formed of an annular body portion 20 of felt or like compressible material, a reinforcing ring 21 of coils of wire embedded within the felt material, the latter being surrounded by a sheathing or holder of an outer series of coils of wire 22.

The coils are spaced from the ends of the body portion 20, so that when the body portion is compressed by winding the coils 22 thereon, the ends of the relatively soft material 20 will be bulged out as shown at 23, in Figure 1.

The inner coils of wire 21 reinforce the material of the washer and increase its resisting power and prevent the relatively soft and loose material from being disintegrated when pressure is applied thereto or by the friction of the revolving shaft.

Surrounding the washers 20—21—22 the collars 15 and 16 and the spring 19, is a casing 24 having an annular flange 25 at the inner end to engage a shoulder 26 on the skein 12, and externally threaded at the outer end to receive a holding cap 27.

The casing 24 forms a receptacle for grease or other lubricant which finds its way by suitable ducts to the space between the skein and hub.

By this means it will be obvious that strain can be applied to the washer and thence against the movable washer 16 and spring 19, by rotating the cap 27 and thus compress the felt or like material against the shaft and effectually prevent the escape of the lubricant from the axle bearing and likewise prevent the entrance of dust and grit to the journal bearing.

The improved device is simple in construction, inexpensive to manufacture, and will be found very useful upon machines which are exposed to dust and sand, such as automobiles, auto trucks, tractors, and the various forms of farm machinery, as well as to ordinary wagons and like vehicles. A suitable locking spring 28 is employed to prevent the cap 27 from working loose.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

A packing comprising a cylindrical body of compressible material having outwardly directed stop ribs at the ends, a coil of wire embedded in the walls of the body and surrounding the opening thereof and spaced from the inner and outer faces of the same, and a binding coil of wire surrounding the outer face of the body and maintained in position by the stop ribs.

In testimony whereof, I affix my signature hereto.

KARL W. LIEBAU.